United States Patent
Woida-O'Brien et al.

(10) Patent No.: US 9,025,226 B2
(45) Date of Patent: May 5, 2015

(54) INFRARED HOLOGRAPHIC PROJECTOR FOR THERMAL MASKING AND DECOYS

(71) Applicant: Raytheon Company, Waltham, MA (US)

(72) Inventors: Rigel Quinn Woida-O'Brien, Tucson, AZ (US); Stephanie Barnes, Tucson, AZ (US)

(73) Assignee: Raytheon Company, Waltham, MA (US)

(*) Notice: Subject to any disclaimer, the term of this patent is extended or adjusted under 35 U.S.C. 154(b) by 108 days.

(21) Appl. No.: 13/903,513

(22) Filed: May 28, 2013

(65) Prior Publication Data

US 2014/0355085 A1 Dec. 4, 2014

(51) Int. Cl.
| | |
|---|---|
| *G03H 1/22* | (2006.01) |
| *F41H 3/00* | (2006.01) |
| *F41H 11/00* | (2006.01) |
| *G03H 1/00* | (2006.01) |
| G03H 1/02 | (2006.01) |

(52) U.S. Cl.
CPC ............. *G03H 1/2249* (2013.01); *G03H 1/22* (2013.01); *F41H 3/00* (2013.01); *F41H 11/00* (2013.01); *G03H 1/0005* (2013.01); *G03H 1/0244* (2013.01); *G03H 1/2286* (2013.01); *G03H 2001/2221* (2013.01); *G03H 2222/16* (2013.01)

(58) Field of Classification Search
CPC .............................. G03H 1/22; G03H 1/2249
USPC ........................................... 359/9–11; 89/938
See application file for complete search history.

(56) References Cited

U.S. PATENT DOCUMENTS

| | | | |
|---|---|---|---|
| 5,938,308 A | 8/1999 | Feldman et al. | |
| 6,024,467 A | 2/2000 | Liu | |
| 6,055,909 A | 5/2000 | Sweeny | |
| 6,512,385 B1 | 1/2003 | Pfaff et al. | |
| 8,066,218 B2 | 11/2011 | Rubin | |
| 8,339,580 B2 | 12/2012 | Stuart et al. | |
| 2011/0128555 A1* | 6/2011 | Rotschild et al. | 356/625 |
| 2011/0157667 A1* | 6/2011 | Lacoste et al. | 359/9 |
| 2011/0279878 A1* | 11/2011 | Thomas | 359/31 |

* cited by examiner

*Primary Examiner* — Scott J Sugarman
*Assistant Examiner* — William R Alexander
(74) *Attorney, Agent, or Firm* — Eric A. Gifford

(57) ABSTRACT

A holographic structure, system and method project a grey-scale image in a narrow IR spectral band that is related to a broadband thermal signature of an object. The projected grey-scale image, when integrated over the broadband, forms either a decoy that approximates the thermal signature of the object or a mask that obscures the thermal signature of the object. The projected image is a tuned phase recording of a desired far field projection. In different embodiments, the projected image is a "positive" or a "negative" image of the object's thermal signature, a difference image between the thermal signatures of a false object and the object or a camouflage image of random features having approximately the same spatial frequency as the object's thermal signature. The goal being to confuse or fool, even for a short period of time, the warfighting or surveillance system or human observer that uses a broadband IR sensor to acquire and view thermal images of the scene.

20 Claims, 6 Drawing Sheets

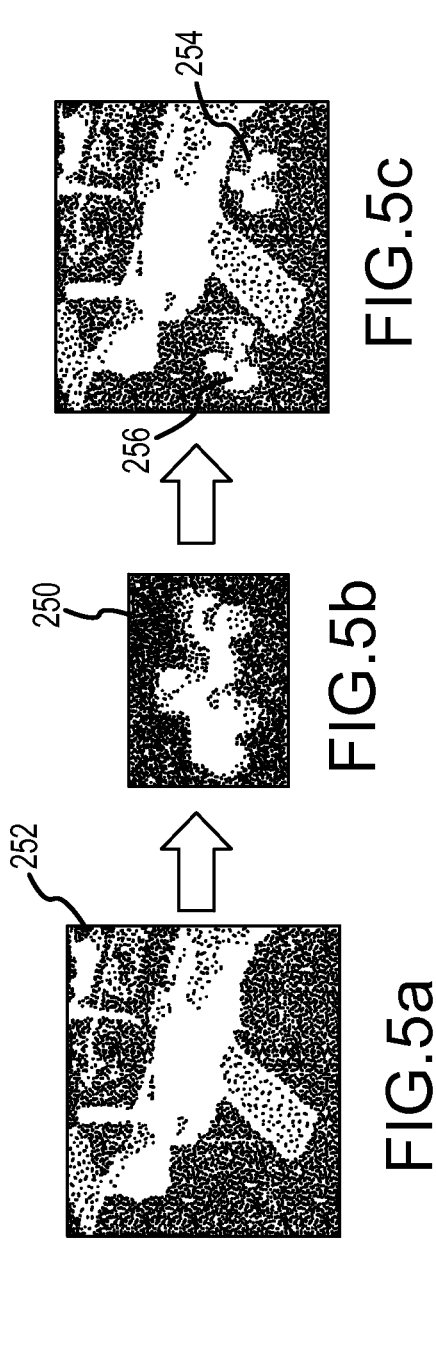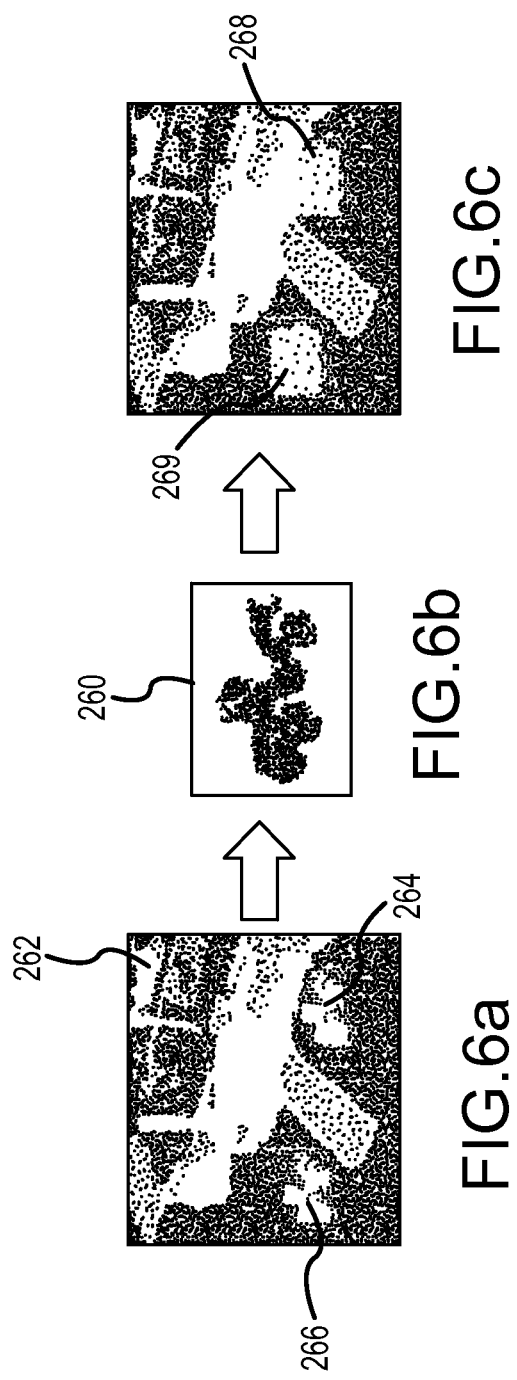

INFRARED HOLOGRAPHIC PROJECTOR FOR THERMAL MASKING AND DECOYS

BACKGROUND OF THE INVENTION

1. Field of the Invention

The present invention relates to thermal masking and decoy technologies, and more particularly to the holographic projection of a grey-scale image in the infrared spectrum that is related to the thermal signature of an object. The holographic projection forms a decoy that approximates the thermal signature of the object or forms a mask that obscures the thermal signature of the object.

2. Description of the Related Art

In warfighting systems, infrared (IR) sensors are deployed to detect the thermal signature of an object such as a person, airplane, tank, jeep etc. and generate an IR image. The system or its human operator may utilize the JR image to detect a "friend or foe", identify the object or to target the object with a munition. Smart munitions may use IR sensors to acquire, track and finally destroy the object.

IR countermeasures may be deployed to create thermal decoys to confuse the warfighting system. In many cases the IR countermeasures only need to confuse the warfighting system for a brief period, perhaps as little as a few seconds, to achieve success. A missile locked onto a target may divert to prosecute the countermeasures. Once the missile has determined the countermeasures are not a valid target it may be too late to reengage.

U.S. Pat. No. 6,055,909 entitled "Electronically configurable towed decoy for dispensing infrared emitting flares" discloses a towed decoy having a payload that consists of foils and/or foil packs of a pyrophoric material. This material creates an IR signature behind the decoy that is more attractive than the infrared plume emitted by the aircraft engine. The fact that the JR decoy is towed insures that it will be kinematically correct by flying the same profile as the aircraft so as to remain within the field of view of the missile's seeker. Because the pyrophoric material can be metered (dispensed at varying and controllable rates) its radiant intensity can be matched with that of the engine of the towing aircraft. As the burn characteristics of the selected pyrophoric material match the burn profile of hydrocarbon based jet fuels, the towed IR decoy also emits a plume that spectrally matches that of its host aircraft's engine.

U.S. Pat. No. 8,066,218 entitled "Anti-missile defense suite" discloses an IR decoy that is deployed from an aircraft during or just after takeoff to provide a signature for any incoming missile. The IR decoy provides a heat source that has a higher radiant intensity than the hottest heat source on the engine. The towed IR decoy is powered by a laser source located within the aircraft and amplified to produce an IR decoy infrared signature in more than one spectral band of a magnitude greater than the infrared signature of said aircraft. The IR decoy infrared signature is distributed through a plurality of optical fibers of various lengths coupled to a plurality of small apertures within the IR decoy.

U.S. Pat. No. 8,339,580 entitled "Sensor-guided threat countermeasure system" discloses a countermeasure system for use by a target to protect against an incoming sensor-guided threat. The system includes a laser system for producing a broadband beam and means for directing the broadband beam from the target to the threat to blind or confuse the incoming sensor-guided threat.

BAE Systems has developed an active camouflage technology to protect military vehicles from detection by near IR night vision devices. The active camouflage consists of an array of hexagonal plates that can be rapidly heated and cooled to form any desired image, such as of the natural background or of a non-target object.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a holographic structure, system and method for projecting a grey-scale image in a narrow IR spectral band that is related to a broadband thermal signature of an object. The projected grey-scale image, when integrated over the broadband, forms either a decoy that approximates the thermal signature of the object or a mask that obscures the thermal signature of the object. The projected image is a tuned phase recording of a desired far field projection. In different embodiments, the projected image is a "positive" or a "negative" image of the object's thermal signature, a difference image between the thermal signatures of a false object and the object or a camouflage image of random features having approximately the same spatial frequency as the object's thermal signature. The goal being to confuse or fool, even for a short period of time, the warfighting or surveillance system or human observer that uses a broadband IR sensor to acquire and view thermal images of the scene or to force the adversary to deploy more sophisticated multi-spectral IR sensors.

In an embodiment, an infrared holographic projector comprises a grey-scale input image related to a broadband thermal signature of an object that spans a first band in the infrared (IR) spectrum, the grey-scale input image having at least three intensity levels. A laser source is configured to generate a narrowband laser beam at a source wavelength in a second band within the first band. A grey-scale holographic structure comprises an infrared transmissive material having a surface arranged to provide differing amounts of phase-delay to the narrowband laser beam as the beam passes through the material to encode the grey-scale input image. The surface comprises at least four phase delay layers that correspond to an integer multiple of quarter-wavelengths of total phase delay at a center wavelength of the infrared transmissive material. Each layer provides a predetermined phase delay at the center wavelength. The surface is configured to diffract the laser beam at the source wavelength at or near the center wavelength to construct a narrow band projected image in the first band in the IR spectrum. The narrowband projected image is a reconstruction of the grey-scale input image that when integrated over said first band either forms a decoy that approximates the broadband thermal signature of the object or a mask that obscures the broadband thermal signature of the object.

In an embodiment, the source wavelength of the narrowband laser beam lies between approximately 800) nm to approximately 2400 nm (e.g. Near IR (NIR) and Short Wave IR (SWIR)). The infrared transmissive material is selected from Borofloat. Calcium Fluoride, Fused Silica, Magnesium Fluoride (MgF2), Potassium Bromide (KBr), Sapphire, Sodium Chloride (NaCl) and Zinc Sulfide.

In an embodiment, the source wavelength of the narrowband laser beam lies between approximately 3 microns to approximately 5 microns (e.g. Mid IR (MIR)). The infrared transmissive material is selected from Calcium Fluoride, Germanium, Magnesium Fluoride (MgF2), Potassium Bromide (KBr), Sapphire, Silicon, Sodium Chloride (NaCl), Zinc Selenide (ZnSe) and Zinc Sulfide.

In an embodiment, the source wavelength of the narrowband laser beam lies between approximately 7 microns to approximately 13 microns (e.g. Long Wave IR (LWIR)). The infrared transmissive material is selected from Germanium, Potassium Bromide (KBr), Sodium Chloride (NaCl), Zinc Selenide (ZnSe) and Zinc Sulfide.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 5a through 5c illustrate the projection of a holographic image to form decoys of an object;

FIGS. 6a through 6c illustrate the projection of a negative holographic image to obscure the thermal signature of an object;

DETAILED DESCRIPTION OF THE INVENTION

The present invention provides a holographic structure, system and method for projecting a grey-scale image in a narrow IR spectral band that is related to a broadband thermal signature of an object. The projected grey-scale image, when integrated over the broadband, forms either a decoy that approximates the thermal signature of the object or a mask that obscures the thermal signature of the object. The projected image is a tuned phase recording of a desired far field projection. The goal being to confuse or fool, even for a short period of time, the warfighting or surveillance system or human observer that uses a broadband IR sensor to acquire and view thermal images of the scene. In the alternative, the goal is to force the adversary to deploy narrowband multispectral sensors that are at the very least more expensive and possibly beyond the adversary's technological capabilities.

Figure 1:
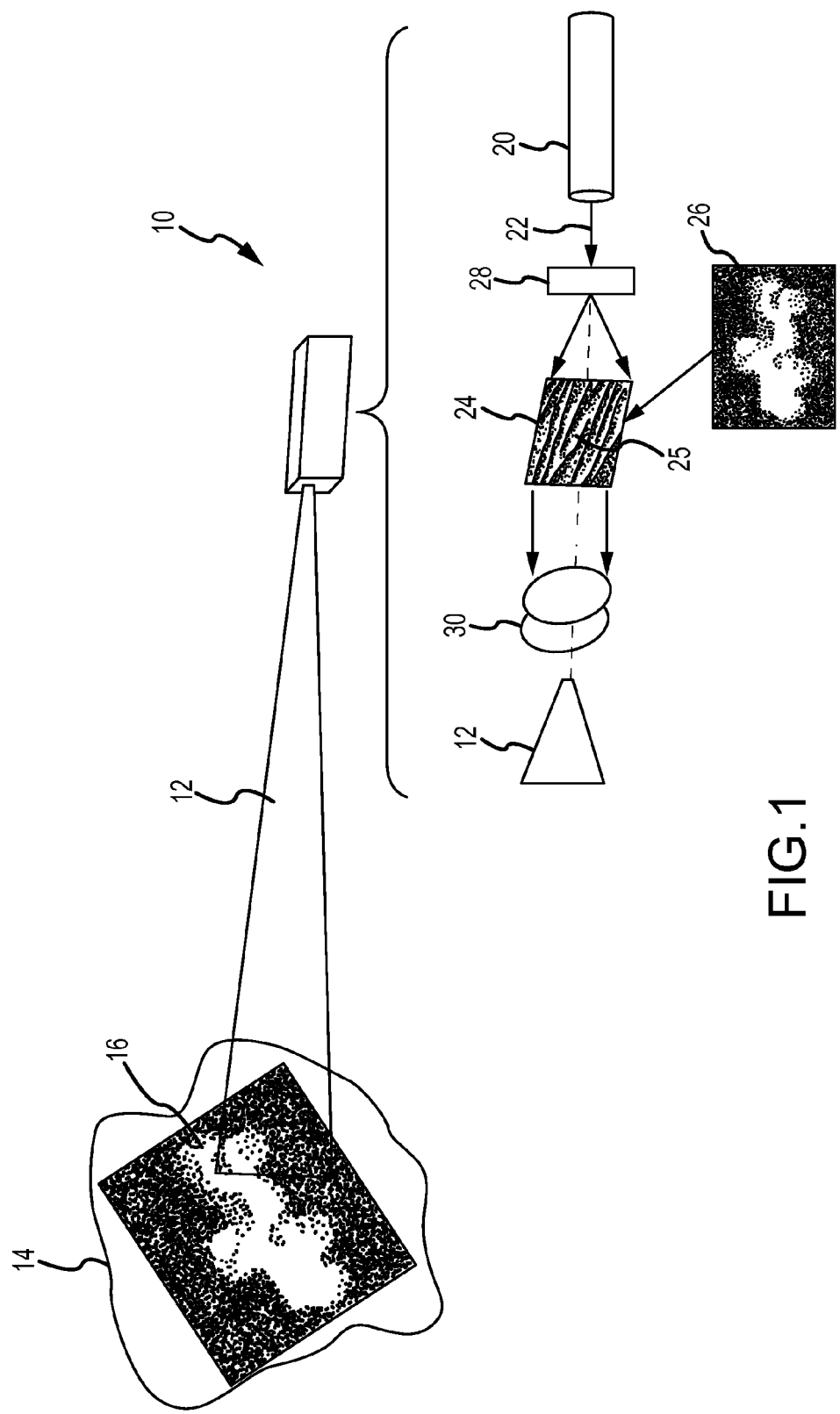
FIG. 1 is a diagram of an embodiment of an infrared holographic projector.

Referring now to FIG. 1, an IR holographic projector 10 projects narrowband laser energy 12 onto a surface 14 to construct a grey-scale image 16 in the IR spectrum. The surface 14 is preferably a reasonably flat, plain surface such as a wall or the ground on which a decoy may be projected or a surface of an object (e.g. a tank, a jeep or aircraft) to be masked. Grey-scale image 16 is a holographic reconstruction of an input image that is related to a broadband thermal signature of the object to be decoyed or masked. The projected grey-scale image 16, when integrated over the broadband, forms either a decoy that approximates the broadband thermal signature of the object or a mask that obscures the broadband thermal signature of the object.

IR holographic projector 10 comprises a laser source 20 configured to generate a narrowband laser beam 22, an IR grey-scale holographic structure 24 configured with a diffraction pattern 25 that encodes a grey-scale input image 26, a beam expander 28 that optically couples the holographic structure 24 to laser beam 22 to diffract the laser beam to construct grey-scale image 16, and optics 30 to project image 16 onto a distant surface.

Grey-scale input image 26 is related to a broadband thermal signature of an object to be decoyed or masked. The broadband signature spans a first band (e.g. NWIR, SWIR, MIR, LWIR or portions thereof) in the IR spectrum. The broadband signature is itself a grey-scale image. The intensity at each pixel in the image being the integrated intensity at that pixel over the broadband. The grey-scale input image 26 has at least three intensity levels. The number of intensity levels may be binary, $2^N$ where N is 2 or greater. Because the input image is related to the broadband thermal signature of an object it generally has no symmetry and may be asymmetric about all axes of symmetry. Some objects may have a thermal signature that exhibits some limited symmetry. The broadband thermal signature of the object may be obtained by imaging the object with a broadband IR sensor or by simulating the thermal emissions of the object. The input image may be "related" to the broadband thermal signature as the positive or negative of the thermal signature in the narrowband spectrum of the laser energy, a difference image between the thermal signatures of a false object (e.g. a tank) and the object (e.g. a jeep) or a camouflage image of random features (e.g. zebra stripes) having approximately the same spatial frequency as the object's thermal signature.

Laser source 20 is configured to emit narrowband laser beam 22 at a source wavelength in a second band within the first band. For example, the broadband thermal signature of the object may span the MIR band from 2-5 microns. The laser source may emit a laser beam at 3.5 microns with a bandwidth of 10-100 nm.

IR grey-scale holographic structure 24 comprises an infrared transmissive material having a surface arranged to provide differing amounts of phase-delay to the narrowband laser beam as the beam passes through the material. The surface comprises at least four phase delay layers (and at least one more layer than the number of intensity levels in the input image) that correspond to an integer multiple of quarter-wavelengths of total phase delay at a center wavelength of the infrared transmissive material (at or near the source wavelength of the laser). Each layer provides a predetermined phase delay at the center wavelength. The surface is configured to form diffraction pattern 25 that encodes the grey-scale input image 26. The spatial resolution of the diffraction pattern is preferably the same as the spatial resolution of the grey-scale input image. The surface is configured to diffract the laser beam 22 to construct the narrowband projected image 16 at the source wavelength in the first band in the IR spectrum. The narrowband projected image 16 being a reconstruction of the grey-scale input image 16 that when integrated over the first band either forms a decoy that approximates the broadband thermal signature of the object or a mask that obscures the broadband thermal signature of the object.

Optics 30 projects grey-scale image 16 onto a distant surface to form a thermal decoy of the object or to mask the thermal signature of the object. Optics 30 may comprise zoom optics configured to change the focal distance of the projection with the range while maintaining a constant size of the projected image. The range may be provided by a range finder incorporated as part of the projector, from an outside source or by an operator.

In different embodiments, the IR holographic projector 10 may be configured as a man portable device or an installed unit. The projector may be operated by a human operator to program, point and shoot. For example, special forces operators may use man portable devices to create IR decoys of other operators or tanks to make their strength appear greater than it is. Alternately, the operators may use the man portable device to mask the IR signature of their equipment e.g. jeeps or helicopters. The projector may be incorporated in a semi or fully-automated system to project the IR holograms. For example, an automated system could project IR decoys to form human sentries around the perimeter of a secured area. Alternately, the automated system could mask the IR signature of aircraft or other assets on the ground.

In different embodiments, IR holographic projector 10 may include a plurality of IR grey-scale holographic structures 24 that encode different input images related to the thermal signatures of different objects. The projector may include a cartridge or carousel that house the different holographic structures 24 and in response to an operator or system selection place one of the structures in the path of the expanded laser beam. Alternately, the projector 10 may be configured to hold a single structure 24 but allow the structure 24 to be removed and replaced with a different structure 24 in the field.

In different embodiments, IR holographic projector 10 may include two or more laser sources that emit laser beams at different source wavelengths both near the center wavelength of the holographic structure 24. The laser sources may be controlled to alternately or simultaneously project the gray-scale image 16 at their respective wavelengths.

In different embodiments, IR holographic projector 10 may include two or more laser sources that emit laser beams at different source wavelengths and two or more gray-scale IR holographic structures 24 at different center wavelengths at or near the different source wavelengths, respectively.

Figure 2A:
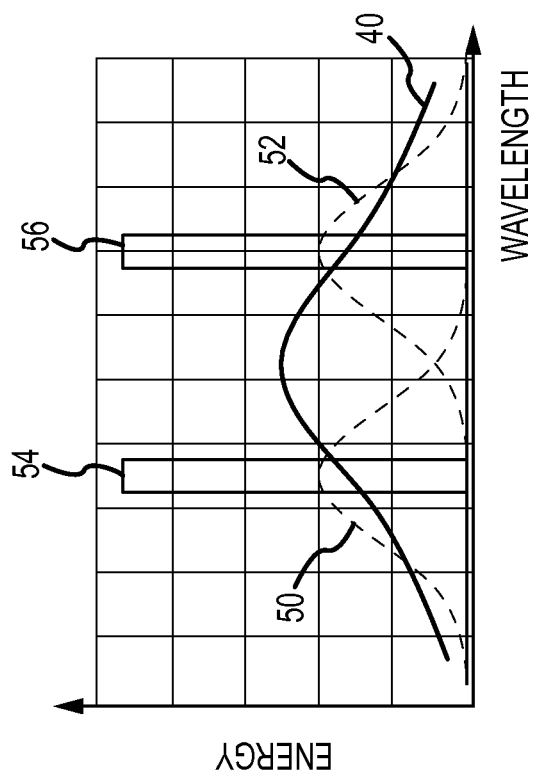
FIGS. 2a and 2b are plots of detected energy versus wavelength for the narrowband projected image of an object and the broadband thermal signature of the object for single and dual-band IR sensors.
Figure 2B:
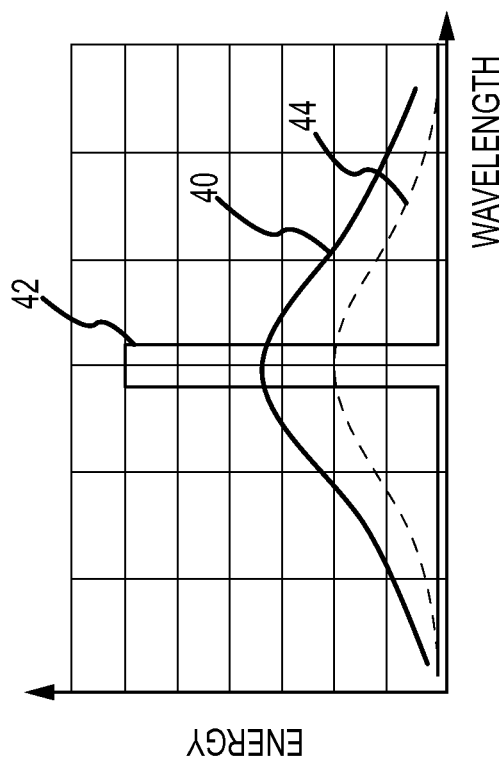

The reason IR holographic projection can be effective to form IR decoys or perform IR masking of an object's thermal signature is illustrated in FIGS. 2a and 2b. An object such as a person or a vehicle emit thermal energy that produces a broadband thermal signature 40. For example, humans typically have a signature in the 1 to 14 micron band with a peak in energy at about 10 microns. A cold manmade object will emit blackbody radiation in the 1 to 14 micron band with a peak in energy at 11 um. If a vehicle's motor is running it may emit radiation in the 1 to 14 micron band with a peak energy at 7.5 um. These thermal signatures will typically span hundreds of nanometers to a few microns, which we consider to be "broadband". By comparison, the grey-scale IR projected image occupies a "narrowband" of a few 10 s of nanometers about the source wavelength of the laser. The IR holographic structure is designed for a specific center wavelength. To project a high-quality image, the laser source must have a source wavelength at or near the center wavelength and must be narrowband.

As shown in FIG. 2a, in this embodiment the narrowband spectrum 42 of the laser source is positioned near the center of the object's broadband thermal signature 40 and is configured to decoy or mask the object against an adversary that deploys an IR sensor having a broadband response 44. The IR sensor integrates the IR energy according to its broadband response 44 at each position or "pixel" in the image to form an IR image. Consequently, the projected holographic image (assuming a "positive" image for a decoy) having a higher peak energy in its narrowband spectrum 42 will have the same integrated energy over the broadband response 44 as the object's broadband thermal signature 40. The IR image of the scene provided to a human operator or to a computer for processing is close enough to confuse or fool the operator or computer.

As adversaries encounter the IR countermeasures provided by the IR holographic projector, they may develop and field multi-spectral IR sensors capable of discriminate the narrowband IR projections from actual broadband signatures. These multi-spectral sensors are more complicated and expensive, and may be beyond the technological capabilities of many adversaries.

As shown in FIG. 2b, the IR holographic projector is configured to fool or confuse a dual-band IR sensor having first and second responses 50 and 52. In this embodiment, the IR holographic projector projects IR grey-scale images having narrowband spectra 54 and 56 positioned at or near the centers of the dual-band response. Assuming a "positive" image for a decoy, the integration of thermal signature 40 and narrowband spectrum 54 over response 50 and of thermal signature 50 and narrowband spectrum 56 over response 52 being similar. The projector may be configured to alternate between bands 54 and 56 or to project both simultaneously. The projector may include a pair of laser sources whose source wavelengths correspond to the spectra 54 and 56. The projector may include a pair of IR holographic structures whose center wavelengths are at or near the pair of source wavelengths or may include a single IR holographic structure whose center wavelength lies between the two source wavelengths.

The principle is the same for the masking embodiments in which narrowband IR energy is added to the object's broadband thermal signature to obscure, change or camouflage the object. The narrowband IR energy is integrated over the broadband response of the IR sensor and thus is hard to distinguish from the natural broadband thermal signature of the object. If the projected image is a "negative" of the broadband thermal signature of the object, the IR image produced by the broadband IR sensor should be an indiscriminate spot. If the projected image is a difference image between the thermal signatures of the object and a false object, the IR image produced by the broadband IR sensor should resemble an image corresponding to the false object. If the projected image contains random features having the same spatial frequency as the object, the IR image produced by the broadband IR sensor should effectively camouflage the object.

Figure 3:
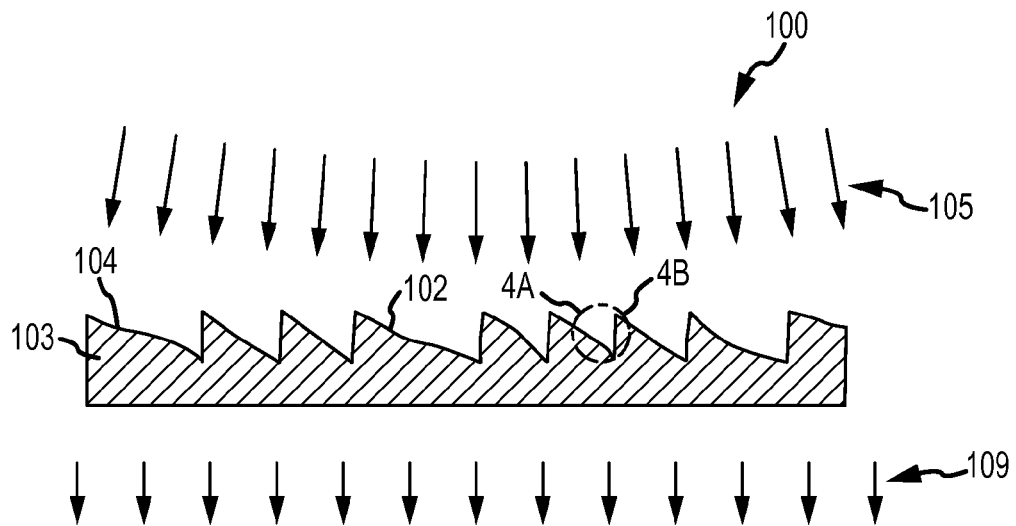
FIG. 3 is a section view of a grey-scale infrared holographic structure.

FIG. 3 is a cross-sectional view of an example grey-scale holographic structure 100 in accordance with some embodiments. The grey-scale holographic structure 100 comprises an infrared transmissive material 103 and has a surface 102 that is arranged to provide differing amounts of phase-delay to an IR laser beam 105 as the incident beam 105 passes through the material 103. The grey-scale holographic structure 100 is a multi-layer structure comprising at least four phase delay layers 104 that correspond to an integer multiple of quarter-wavelengths at the center wavelength of the material 103. The number of layers 104 being at least one more than the number of intensity levels in the input image. Each layer 104 may have a differing or the same thickness and may provide a predetermined amount of phase delay.

In some of these embodiments, each layer 104 may correspond to a shade of grey that may be represented by values of a bitmap representing a grey-scale hologram. These embodiments are discussed in more detail below.

In some embodiments, each of the multiple layers 104 may be selected to provide a phase total delay of lambda to result from a number (N) of layers 104 in which each layer 104 has a thickness of a center wavelength/N. In some example embodiments, the number of layers 104 (N) of the grey-scale holographic structure 100 may range from four to two-hundred and fifty-five and may have a corresponding effect of one-quarter wavelength to a two-hundred and fifty-fifth of a wavelength (i.e., for the different thickness of the structure 100). In some embodiments, each layer 104 may be selected to provide a phase total delay of lambda from N number of tuned layers 104, each having a thickness of the center wavelength/N. In these embodiments, the phase total delay results from this series of tuned layers 104.

In these embodiments, a center wavelength may refer to a source wavelength of the frequency of the incident laser beam 105. Lambda (λ) may refer to wavelength(s), in which: E=hv, $$\lambda = \frac{c}{v},$$

where: E is the energy of photon, h is Planck's constant, v is the frequency of a photon, and c is the speed of light.

In some embodiments, the layers 104 of the surface 102 may be designed and configured to modify characteristics of the incident laser beam 105 via the diffractive-wave properties tuned within the material 103 when transmissing through the material 103 to generate an output laser beam 109 having predetermined characteristics (e.g. characteristics of the encoded grey-scale input image). In these embodiments, the grey-scale holographic structure 100 may operate as a phase-delay hologram using the various phase delays that occur as the laser beam 105 travels through the material 103. In these embodiments, more phase delay occurs in thicker portions of the structure 100 and less phase delay occurs in thinner portions of the structure 100. Accordingly, the thickness of the material 103 at any given point provides a certain phase delay. In some embodiments, the surface 102 is arranged to provide varying amounts of phase-delay. This is unlike conventional amplitude holograms that use the amplitude of an incident wave and rely on reflective zones and transmissive zones. Reflective zones reflect most or all of the energy incident on a reflective zone without a phase delay. Transmissive zones pass most or all of the energy incident on a transmissive zone without a phase delay.

Figure 4A:
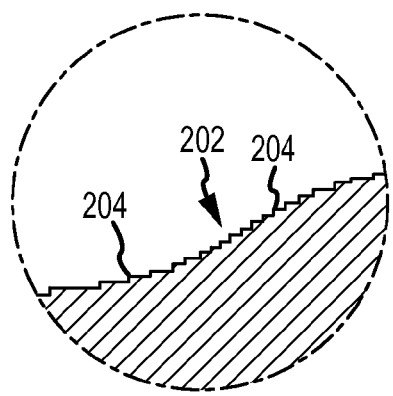
FIGS. 4a and 4b illustrate embodiments of stepped-surface and smooth surface embodiments, respectively, of a gray-scale holographic structure.

FIG. 4a illustrates stepped-surface embodiments of a grey-scale IR holographic structure 100 (FIG. 3) in accordance with some embodiments. In these embodiments, the layers 204 of the surface 202 are stepped and each layer 204 may comprise a surface region and be associated with a distance thorough the material 103 (FIG. 3) (e.g., a thickness). In this example, layers 204 may correspond to layers 104 (FIG. 3) and surface 202 may correspond to surface 102 (FIG. 3) of grey-scale holographic structure 100 (FIG. 3).

In these embodiments, each layer 204 may be a substantially flat surface region that may be provided normal to the incident wavefront 105 (FIG. 3), although this is not a requirement. Each layer 204 may be associated with a different thickness of material 103 providing an associated predetermined phase delay. In these embodiments, the width of each step may be on the order of ¼ of a wavelength to ¹⁄₁₀₀ of a wavelength and the height of each step may be the center wavelength/N. In some embodiments, each layer 204 may be selected to provide a phase total delay of lambda from N number of layers 204, each with a thickness of a wavelength/N.

Figure 4B:
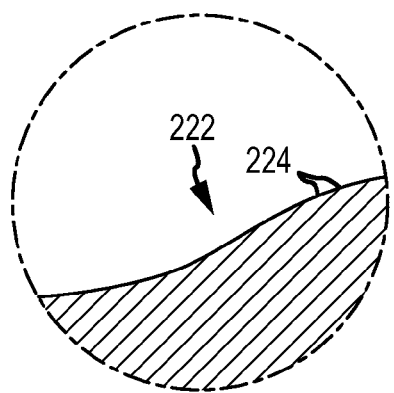

FIG. 4b illustrates smooth-surface embodiments of a grey-scale holographic structure 100 (FIG. 3) in accordance with some embodiments. In these embodiments, the layers 224 of the surface 222 are smooth to provide a curved surface. In this example, layers 224 may correspond to layers 104 (FIG. 3) and surface 222 may correspond to surface 102 (FIG. 3) of grey-scale holographic structure 100 (FIG. 3). In these alternate embodiments, rather than stepped layers 204, a smooth surface 222 is provided. Each layer 224 may be curved and may be associated with a different thickness of material 103 (FIG. 3) providing an associated predetermined phase delay.

The grey-scale holographic structure 100 may be fabricated by a three-dimensional (3D) fabrication process. In some embodiments, the surface 102 may be fabricated using a 3D stereo-lithographic process including micro-lithography. 3D stereo-lithography may be used to fabricate both the stepped-surface embodiments illustrated in FIG. 4a and the smooth-surface embodiments illustrated in FIG. 4b. Other fabrication techniques may be used that are suitable for providing feature sizes ranging from about ¼ wavelength to ¹⁄₆₀ of a wavelength.

In some embodiments, the number of layers 104 (N) may be at least ten per each lambda. In some embodiments, the number of layers 104 of the grey-scale holographic structure 100 may be as few as four to as great as 256 or more. In some embodiments, at least ten layers 104 are used. In other embodiments, at least one-hundred layers 104 are used. The limitation on the maximum number of layers 104 (per wavelength) may be based on the wavelength, selected phase delay integer, the material index of refraction, and precision ability to manufacturing the phase steps. The selected phase delay integer may be the number of levels per lambda.

In some embodiments, the grey-scale holographic structure 100 may operate as a grey-scale hologram or as a diffractive optical element (DOE) at IR wavelengths. In some embodiments, the grey-scale holographic structure 100 may be a computer-generated hologram (CGH).

In some embodiments, the total optical path difference (OPD) may be calculated from the following equation:

$$TotalOPD = \lambda = \left(\frac{\lambda}{N_s - N_a}\right) = \text{depth\_of\_pattern}$$

λ=Wavelength of electromagnetic wave to be effected,
Ns=Index of substrate material 103.
Na=Index of material outside substrate (e.g., vacuum=1).
In these embodiments, the phase per step may be calculated as follows, where each layer corresponds to one step:

$$\text{Phase\_per\_step} = \frac{TotalOPD}{\#\_of\_Steps} \text{(Typically \# of steps is between 0-256)}$$

In some embodiments, the ideal non-quantized OPD for holographic optical elements (HOE) in transmission using single-harmonic modulus may be represented as λ, the ideal non-quantized depth in material 103 may be represented as d=λ(Ns−Na). The quantized depth per step may be represented as d/q=λ/(q*(Ns−Na)), where q may be the number of quantization levels (steps) and may be between 4 and 256, and the OPD per step may be represented as λ/q. The phase per step may be represented as d*(Ns−Na)*2*pi/λ=2*pi/q.

In some embodiments, the IR transmissive material 103 may be transmissive at one or more predetermined IR wavelengths ranging from approximately 800 nm to approximately 2400 nm (e.g. Near IR (NIR) and Short Wave IR (SWIR)). The IR transmissive material 103 may be selected from Borofloat, Calcium Fluoride, Fused Silica, Magnesium Fluoride (MgF2), Potassium Bromide (KBr), Sapphire. Sodium Chloride (NaCl) and Zinc Sulfide.

In some embodiments, the IR transmissive material 103 may be transmissive at one or more predetermined IR wavelengths ranging from approximately 3 microns to approximately 5 microns (e.g. Mid IR (MIR)). The IR transmissive material 103 may be selected from Calcium Fluoride, Germanium, Magnesium Fluoride (MgF2), Potassium Bromide (KBr), Sapphire, Silicon, Sodium Chloride (NaCl), Zinc Selenide (ZnSe) and Zinc Sulfide.

In some embodiments, the IR transmissive material 103 may be transmissive at one or more predetermined IR wavelengths ranging from approximately 7 microns to approximately 13 microns (e.g. Long Wave IR (LWIR)). The IR transmissive material 103 may be selected from Germanium, Potassium Bromide (KBr), Sodium Chloride (NaCl), Zinc Selenide (ZnSe) and Zinc Sulfide.

Referring now to FIGS. 5a, 5b and 5c, an IR holographic projector(s) may be configured to project a grey-scale image 250 in the IR spectrum into a scene 252 to form IR decoys 254 and 256 of a jeep. In this case, the grey-scale input image is the "positive" image of the jeep's broadband thermal signature. The peak energy of the projected grey-scale image 250 is significantly higher than the energy of the broadband thermal signature of the jeep at the same wavelength. Accordingly, when the IR sensor integrates the detected energies over its broadband response the total energy of the IR decoys is close enough to the total energy of the actual broadband thermal signature to confuse or fool either a human looking at the detected IR image or a computer configured to process the IR image.

Referring now to FIGS. 6a, 6b and 6c, an IR holographic projector(s) may be configured to project a grey-scale image 260 in the IR spectrum into a scene 262 to mask the broadband thermal signatures 264 and 266 of two different jeeps. In this case, the grey-scale input image is the "negative" image of the jeep's broadband thermal signature. The peak energy of the projected grey-scale image 260 is significantly higher than the energy of the broadband thermal signature of the jeep at the same wavelength. Accordingly, when the IR sensor integrates the detected energies over its broadband response the total energy of the IR decoys is close enough to the total energy of the actual broadband thermal signature that the positive thermal image of the jeep and the negative thermal image of the projected image add together to form indeterminate spots 268 and 269 to confuse or fool either a human looking at the detected IR image or a computer configured to process the IR image.

Figure 7C:
FIGS. 7a through 7c illustrate the projection of a holographic image to add structure to the thermal signature of the object to appear as a different object.
Figure 7B:
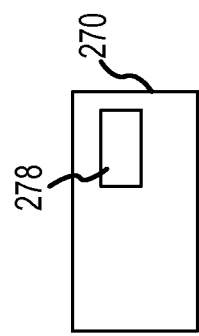
Figure 7A:

Referring now to FIGS. 7a, 7b and 7c, an IR holographic projector(s) may be configured to project a grey-scale image 270 in the IR spectrum into a scene 272 to mask the broadband thermal signatures 274 of a jeep to look like the broadband thermal signature 276 of a truck. In this case, the grey-scale input image 270 is a difference image between the broadband thermal signatures of the truck and the jeep. In this example, the truck includes a closed canopy 278 that the jeep does not.

Figure 8C:
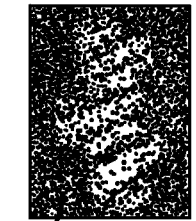
FIGS. 8a through 8c illustrate the projection of a camouflage holographic image to add random features having the same spatial frequency as the object to obscure the object.
Figure 8B:
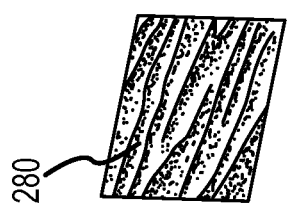
Figure 8A:
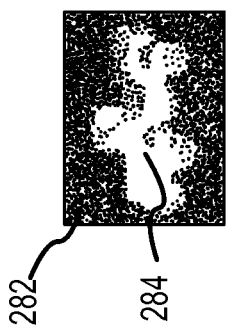

Referring now to FIGS. 8a, 8b and 8c, an IR holographic projector(s) may be configured to project a grey-scale image 280 in the IR spectrum into a scene 282 to camouflage the broadband thermal signatures 284 of a jeep to create a thermal signature 286 that blends into the scene. In this case, the grey-scale input image includes random features such as found in camouflage that have the same spatial frequency (size and shape) as features of the object.

Figure 9:
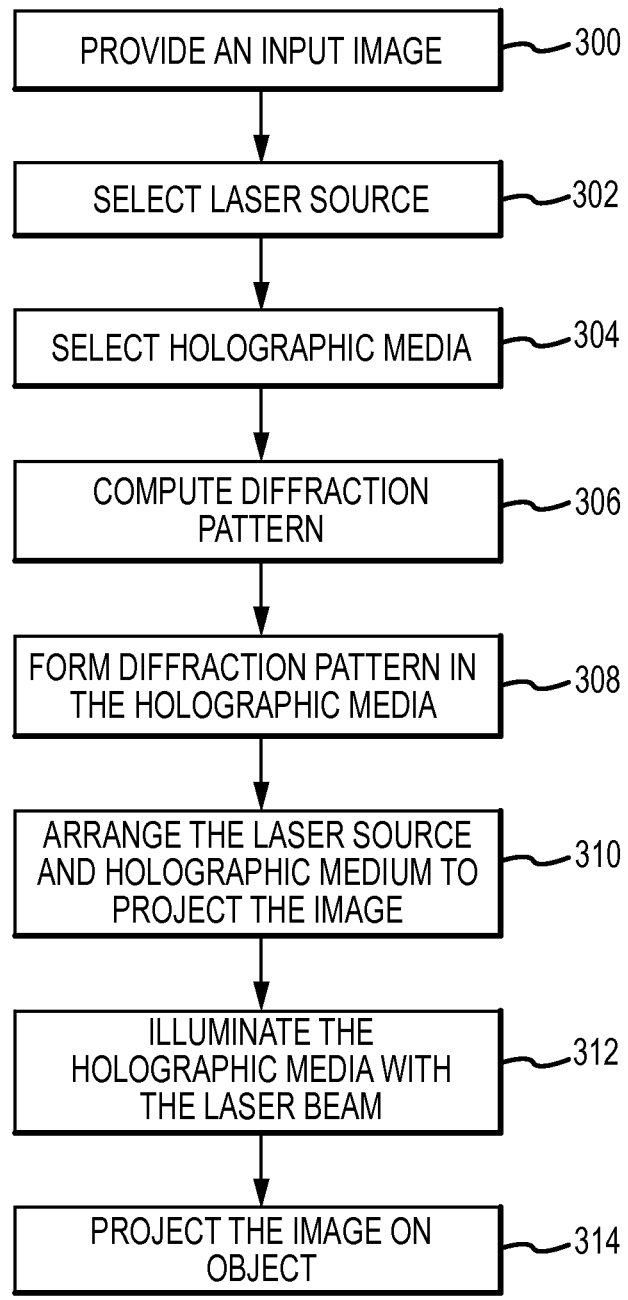
FIG. 9 is an embodiment of a procedure for producing the infrared holographic structure and projecting the holographic image.

FIG. 9 is a flow chart of another embodiment of a method of projecting an grey-scale IR image, using a holographic laser projector according to aspects discussed herein. The method of projecting a grey-scale IR image includes providing a grey-scale input image related to a broadband thermal signature of an object (Step 300). The input image may be a positive or negative of the broadband thermal signal, a difference image between the broadband thermal signals of the object to be masked and a false object or a camouflage image of random features having the same spatial frequency of the object to be masked.

The method includes selecting a laser source to generate a laser beam at a source wavelength in a narrowband within the broadband of the object's thermal signature (Step 302) and selecting a holographic medium having a transmittance range including the source wavelength of the laser beam (Step 304).

The method further includes computing a diffraction pattern for the input image according to the selection of the laser source and the holographic medium (Step 306). The diffraction pattern is then formed in the holographic medium (Step 308). In one example, the holographic medium is etched with a respective diffraction pattern. The laser source and holographic medium may be arranged to project the input image (Step 310). The method further includes illuminating the holographic medium with the laser beam (Step 312), thereby projecting an image to a distance (Step 314). The image is a reconstruction of the input image in the narrowband of the IR spectrum about the laser's source wavelength.

It is to be appreciated that some of the steps shown in FIG. 7 may be performed in another order or may overlap. For example, in one embodiment, the holographic medium may be selected prior to selecting the laser source. In this embodiment, the laser source may be selected to generate the laser beam having a source wavelength within the transmittance range of the holographic medium.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An infrared holographic projector comprising:
a grey-scale input image related to a thermal signature of an object, said grey-scale input image having at least three intensity levels;
a laser source configured to generate a laser beam in a narrowband including a source wavelength in an infrared spectral range; and
an infrared transmissive material having a surface arranged to provide differing amounts of phase-delay to the first laser beam as the beam passes through the material, said surface comprising at least four phase delay layers that correspond to an integer multiple of quarter-wavelengths of total phase delay at a center wavelength, each layer providing a predetermined phase delay at the center wavelength, said surface configured to encode the grey-scale input image, said surface configured to diffract the laser beam at the source wavelength at or near the center wavelength to construct a projected image in the infrared spectrum that forms a decoy that approximates the thermal signature of the object or a mask that obscures the thermal signature of the object.

2. The infrared holographic projector of claim 1, wherein the grey-scale input image and projected image are asymmetric about all axes of symmetry.

3. The infrared holographic projector of claim 1, wherein the spatial resolutions of the thermal signature of the object, the grey-scale input image and the surface of the infrared transmissive material are the same.

4. The infrared holographic projector of claim 1, wherein the grey-scale input image is a positive image of the thermal signature of the object, wherein said projected image forms the decoy that approximate the thermal signature of the object.

5. The infrared holographic projector of claim 1, wherein the grey-scale input image is a negative image of the thermal signature of the object, wherein said projected image forms the mask that adds to the thermal signature of the object to obscure the object.

6. The infrared holographic projector of claim 1, wherein the grey-scale input image is a difference image between a thermal signature of a different false object and thermal signature of the object, wherein said projected image forms the decoy that approximates the thermal signature of the different false object.

7. The infrared holographic projector of claim 1, wherein the grey-scale input image is a camouflage image with random features whose spatial frequency approximates that of the thermal signature of the object, wherein said projected image forms the mask that adds to the thermal signature of the object to camouflage the object.

8. The infrared holographic projector of claim 1, wherein the integrated power of the projected image over the narrowband of the first laser beam approximates the integrated power of the thermal signal of the object over an infrared sensor broadband.

9. The infrared holographic projector of claim 1, wherein the projected image is a tuned phase recording of a desired far field projection of the grey-scale input image.

10. The infrared holographic projector of claim 1, wherein the infrared spectral range spans approximately 800 nm to approximately 13 microns.

11. The infrared holographic projector of claim 1, wherein the center and source wavelengths lie between approximately 800 nm to approximately 2400 nm, said infrared transmissive material selected from Borofloat, Calcium Fluoride, Fused Silica, Magnesium Fluoride (MgF2), Potassium Bromide (KBr), Sapphire, Sodium Chloride (NaCl) and Zinc Sulfide.

12. The infrared holographic projector of claim 1, wherein the center and source wavelengths lie between approximately 3 microns to approximately 5 microns, said infrared transmissive material selected from Calcium Fluoride, Germanium, Magnesium Fluoride (MgF2), Potassium Bromide (KBr), Sapphire, Silicon, Sodium Chloride (NaCl), Zinc Selenide (ZnSe) and Zinc Sulfide.

13. The infrared holographic projector of claim 1, wherein the center and source wavelengths lie between approximately 7 microns to approximately 13 microns, said infrared transmissive material selected from Germanium, Potassium Bromide (KBr), Sodium Chloride (NaCl), Zinc Selenide (ZnSe) and Zinc Sulfide.

14. A grey-scale infrared holographic structure comprising:
an infrared transmissive material having a surface comprising at least four phase delay layers that correspond to an integer multiple of quarter-wavelengths of total phase delay at a center wavelength in the infrared (IR) spectrum, each layer providing a predetermined phase delay at the center wavelength,
wherein the at least four layers of the surface are configured to encode a grey-scale input image related to a broadband thermal signature of an object that spans a first band in the IR spectrum, said grey-scale input image having at least three intensity levels,
wherein the surface is arranged to provide differing amounts of phase-delay to a narrowband laser beam as the beam passes through the material, said narrowband laser beam having a source wavelength in a second band that lies within said first band and at or near the center wavelength.

15. The infrared holographic projector of claim 14, wherein the infrared transmissive material is transmissive at the center and source wavelengths that lie between approximately 800 nm to approximately 2400 nm, said infrared transmissive material selected from Borofloat, Calcium Fluoride, Fused Silica, Magnesium Fluoride (MgF2), Potassium Bromide (KBr), Sapphire, Sodium Chloride (NaCl) and Zinc Sulfide.

16. The infrared holographic projector of claim 14, wherein the infrared transmissive material is transmissive at the center wavelength lies between approximately 3 microns to approximately 5 microns, said infrared transmissive material selected from Calcium Fluoride, Germanium, Magnesium Fluoride (MgF2), Potassium Bromide (KBr), Sapphire, Silicon, Sodium Chloride (NaCl), Zinc Selenide (ZnSe) and Zinc Sulfide.

17. The infrared holographic projector of claim 14, wherein the infrared transmissive material is transmissive at the center wavelength lies between approximately 7 microns to approximately 13 microns, said infrared transmissive material selected from Germanium, Potassium Bromide (KBr), Sodium Chloride (NaCl), Zinc Selenide (ZnSe) and Zinc Sulfide.

18. A method of holographic projection of an infrared image comprising:
providing a grey-scale input image related to a broadband thermal signature of an object that spans a first band in an infrared (IR) spectrum from approximately 800 nm and approximately 13 microns, said grey-scale input image having at least three intensity levels;
providing a grey-scale holographic structure comprising an infrared transmissive material having a surface comprising at least four phase delay layers that correspond to an integer multiple of quarter-wavelengths of total phase delay at a center wavelength, each layer providing a predetermined phase delay at the center wavelength, said surface configured to encode the grey-scale input image;
generating a narrowband laser beam having a source wavelength in a second band within said first band, said source wavelength at or near the center wavelength;
illuminating the surface of the infrared transmissive material with the laser beam;
diffracting the laser beam to construct a narrowband infrared image, the infrared image being a reconstruction of the input image in the second band of the IR spectrum; and
projecting the infrared image into a scene to form a narrowband projected image that when integrated over the first band either forms a decoy that approximates the broadband thermal signature of the object or a mask that obscures the broadband thermal signature of the object.

19. The method of claim 18, wherein the grey-scale input image and the projected image are asymmetric about all axes of symmetry.

20. The method of claim 18, wherein the integrated power of the projected image over the narrowband of the first laser beam approximates the integrated power of the thermal signal of the object over an infrared sensor broadband.

* * * * *